United States Patent Office 3,183,160
Patented May 11, 1965

3,183,160
STEROID MEDICATION FOR METABOLIC DISORDERS
Jean de Larebeyrette, 27 Rue Saint-Georges, Paris, France
No Drawing. Filed June 21, 1963, Ser. No. 289,744
Claims priority, application France, June 22, 1962, 901,719
1 Claim. (Cl. 167—77)

The present invention relates to a corrective medication for disorders of the cell metabolism and more especially those disorders which give rise to ailments such as alpha-2 dysproteinemia (hemogliasis, plethora, collagenosis) and dyslipemia (of the type involving exocrine pancreatic deficiency).

The medication in accordance with the invention is essentially characterized by the citrate and/or the isocitrate of 11-deoxy-17-hydroxycorticosterone and/or by a compound which contains at least one of these substances.

The citrate (or isocitrate) in accordance with the invention can be prepared in the following manner:

One liter of anhydrous ethyl oxide is placed in a balloon-flask having two delivery tubes and fitted with a mechanical stirrer and is brought to $-10°$ C.; the liquid is saturated with dry gaseous hydrochloric acid; there are then added 500 mg. of 11-deoxy-17-hydroxycorticosterone and the equimolecular quantity of citric acid (or of isocitric acid) namely 277 mg.

Dry hydrochloric gas is continuously passed through the mixture while maintaining the temperature at $-10°$ C. until the 11-deoxy-17-hydroxycorticosterone has completely dissolved; the esterification reaction lasts approximately 4 to 5 hours.

The ethyl oxide is then vacuum evaporated until completely dry; the residue which is obtained is triturated with a further quantity of ethyl oxide and this solvent is again evaporated; these operations are repeated a number of times in order to eliminate the excess acid.

The final residue is vacuum dried on phosphoric anhydride and potash; the dry product which is thus obtained is dissolved in acetone precipitated by the addition of water and filtered; this operation is carried out once again.

The process of esterification at $-10°$ C. as heretofore described avoids the need for secondary reactions (in particular of resinification of 11-deoxy-17-hydroxycorticosterone), thereby making it possible to obtain a pure product with a substantial yield.

The ester which is thus obtained has a melting point equal to 196°-198° C.; it exhibits a fluorescence of carmine hue in the presence of concentrated sulphuric acid; elementary analysis gives the empirical formula $C_{27}H_{36}O_{10}$, which confirms the theory; the proportions by weight of the elements are:

| Element | Theoretical percentage | Experimental percentage |
|---|---|---|
| C | 62.10 | 65.00 |
| H | 6.92 | 7.50 |
| O | 30.77 | 30.20 |

The citric ester formula can be represented by:

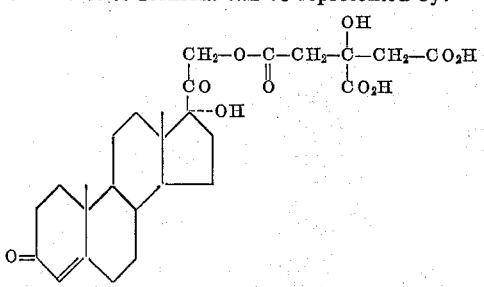

whereas the formula of its isomer, the isocitric ester, can be represented as follows:

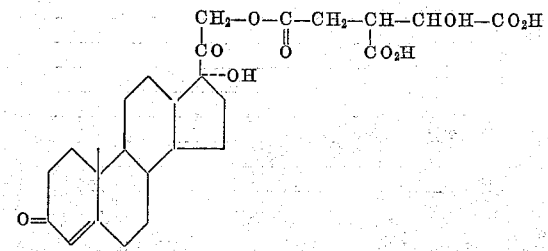

It is in any case not possible for these esters to be accompanied by mono-esters corresponding to each of the other acid functions of the citric and isocitric acids or even of the di- or tri-esters of these acids.

The medication in accordance with the invention can be administered in different forms such as compressed tablets, pills, suppositories, ointments; however, administration by mouth is preferred.

Apart from the usual excipients, this medication can comprise adjuvants such as: magnesium citrate, iodized protein.

There now follows below a few examples of application of the medication in accordance with the invention; it will be understood that these examples are not given in any limiting sense.

Example I

The following medication is administered to a person 51 years of age who is afflicted with hemogliasis and obesity, with flatulent dyspepsia and a marked biological and clinical atheroma: medication A—compressed tablets of 1 g. containing 2 mg. of citrate of 11-deoxy-17-hydroxycorticosterone at a rate of 6 tablets per day, taken three times daily (morning, noon and night).

Prior to this treatment, the patient had been following a conventional treatment for a period of two years; he was not well able to tolerate $D_1$-dehydrohydrocortisone; he was distinctly intolerant to the decadrols, to the dione anti-coagulants and to the dicoumarols.

Prior to treatment with the new medication, the biological condition of the patient could be summarized by the following table of his blood tests:

| | |
|---|---|
| Viscosity | 6.2 |
| Alpha-2 euglobulins | 86 |
| Beta euglobulins | 74 |
| Total lipids g | 14 |
| Beta lipoproteins percent | 89 |
| Alpha lipoproteins do | 4 |
| Gamma lipoproteins do | 7 |
| Percentage of prothrombin | 125 |
| Amylasemia | 200 |
| Cholesterolytic power percent | −25 |
| Urea g | 0.64 |
| Uricaemia g | 0.096 |

The said treatment lasted 4 months without incident; at the end of the first two months, the following results were observed:

| | |
|---|---|
| Viscosity | 5.1 |
| Alpha-2 euglobulins | 66 |
| Beta euglobulins | 55 |
| Total lipids g | 9.25 |
| Beta lipoproteins percent | 74 |
| Alpha lipoproteins do | 9 |
| Gamma lipoproteins do | 13 |
| Percentage of prothrombin | 95 |
| Amylasemia | 175 |
| Cholesterolytic power percent | −11 |
| Urea g | 0.56 |
| Uricaemia g | 0.045 |

After four months of treatment with the medication in accordance with the invention, the results were as follows:

| | |
|---|---|
| Viscosity | 4.9 |
| Alpha-2 euglobulins | 56 |
| Beta euglobulins | 50 |
| Total lipids _____g | 8.40 |
| Beta lipoproteins _____percent | 61 |
| Alpha lipoproteins _____do | 14 |
| Gamma lipoproteins _____do | 25 |
| Percentage of prothrombin | 90 |
| Amylasemia | 133 |
| Cholesterolytic power ____percent | —11 |
| Urea _____g | 0.55 |
| Uricaemia _____g | 0.04 |

A slight condition of irritability is observed at the end of the treatment; the states of somnolence have disappeared and the subject sleeps soundly, but only 7 hours per day instead of the 9 or 10 hours which had previously been essential to him.

*Example II*

The patient, who is 42 years of age, is afflicted with hemogliasis and has already had two automobile accidents as a result of sleeping at the steering-wheel after meals; his sexual activity has considerably diminished since the age of 40; the patient has low blood pressure (100/40); he suffers from tachycardia, from dyspnea in the event of physical exertion, from sciatica by arthrosis L–5, S–1, from dyspepsia, from ischialgia, from loss of appetite.

Prior to treatment, the biological state of this patient could be analyzed as follows from blood tests:

| | |
|---|---|
| Viscosity | 5.5 |
| Urea _____g | 0.25 |
| Cholesterolytic power ____percent | +15 |
| Alpha-2 euglobulins | 72 |
| Beta euglobulins | 64 |
| Glycaemia | 0.960 |

The patient was then subjected to the following medication: medication B—compressed tablets of 1 g. containing 2 mg. of isocitrate of 11-deoxy-17-hydroxycorticosterone at a rate of 2 tablets per day (1 taken at each meal).

After three months of treatment, the results are as follows:

| | |
|---|---|
| Viscosity | 5 |
| Urea | 0.31 |
| Cholesterolytic power _____percent | +18 |
| Alpha-2 euglobulins | 61 |
| Beta euglobulins | 45 |
| Glycaemia | 1.020 |

After a total period of 5½ months, the following results were obtained:

| | |
|---|---|
| Viscosity | 4.5 |
| Urea | 0.36 |
| Cholesterolytic power _____percent | +12 |
| Alpha-2 euglobulins | 49 |
| Beta euglobulins | 27 |
| Glycaemia | 0.960 |

Periods of somnolence have completely disappeared after 15 days of treatment; blood pressure has risen to 120/60 after an interval of 5 months and to 130/80 at the end of 6 months' treatment; the sciatica receded in the course of 3 or 4 days and disappeared after 3 weeks of treatment.

The patient who also complained of flatulent dyspepsia digests well and his appetite has increased to such an extent that he is obliged to have breakfast, which for the past three years had never once been the case. His sleep and his sexual activity have also become normal.

What I claim is:

A pharmaceutical composition comprising a member selected from the group consisting of a compound of the formula

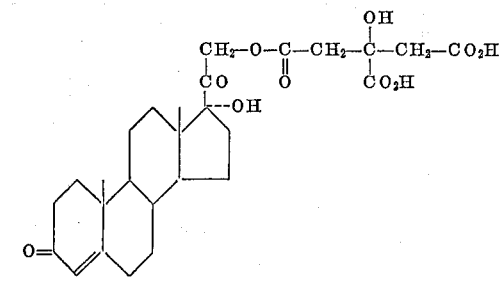

and of a compound of the formula

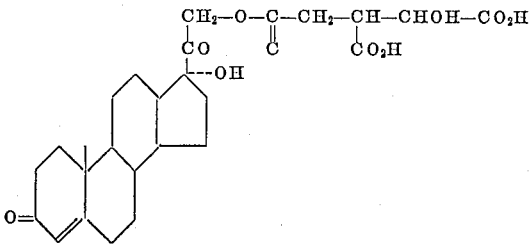

and mixtures thereof in an amount ranging from 0.5 to 5 mg. and a pharmaceutical carrier.

References Cited by the Examiner

UNITED STATES PATENTS

| | | | |
|---|---|---|---|
| 2,183,589 | 12/39 | Reichstein | 260—397.47 |
| 2,793,159 | 5/57 | Johnson | 167—77 |
| 2,801,202 | 7/57 | Poetsch | 167—77 |
| 2,860,149 | 11/58 | Loken | 260—394.47 |
| 2,862,939 | 12/58 | Dodson | 260—397.47 |
| 2,928,852 | 3/60 | Lincoln | 167—77 |

OTHER REFERENCES

McGinty: Science, volume 112, page 506, October 1950.

Winter et al.: J. Am. Pharm. Assoc., Sc. Ed., volume XLVI, No. 9, September 1957, page 517.

JULIAN S. LEVITT, *Primary Examiner.*

FRANK CACCIAPAGLIA, JR., LEWIS GOTTS, *Examiners.*